(12) United States Patent
Carden

(10) Patent No.: US 7,650,423 B2
(45) Date of Patent: *Jan. 19, 2010

(54) SYSTEM AND METHOD FOR PROVIDING UPDATE INFORMATION

(75) Inventor: Chris Carden, Seattle, WA (US)

(73) Assignee: RealNetworks, Inc., Seattle, WA (US)

( * ) Notice: Subject to any disclaimer, the term of this patent is extended or adjusted under 35 U.S.C. 154(b) by 369 days.

This patent is subject to a terminal disclaimer.

(21) Appl. No.: 11/344,584

(22) Filed: Jan. 30, 2006

(65) Prior Publication Data

US 2006/0206607 A1    Sep. 14, 2006

Related U.S. Application Data

(63) Continuation of application No. 09/318,755, filed on May 25, 1999, now Pat. No. 6,996,627.

(51) Int. Cl.
G06F 13/00    (2006.01)
(52) U.S. Cl. ............................. 709/237; 725/39; 725/50
(58) Field of Classification Search ................. 709/237, 709/224, 228, 230, 203; 710/220; 725/50, 725/39
See application file for complete search history.

(56) References Cited

U.S. PATENT DOCUMENTS

| | | | |
|---|---|---|---|
| 5,019,963 A | 5/1991 | Alderson et al. | |
| 5,155,847 A | 10/1992 | Kirouac et al. | |
| 5,247,683 A | 9/1993 | Holmes et al. | |
| 5,408,619 A | 4/1995 | Oran | |
| 5,421,009 A | 5/1995 | Platt | |
| 5,421,017 A | 5/1995 | Scholz et al. | |
| 5,473,772 A | 12/1995 | Halliwell et al. | |

(Continued)

FOREIGN PATENT DOCUMENTS

GB    2331884 A    6/1999

(Continued)

OTHER PUBLICATIONS

Vinay, Kanitkar and Alex Delis, "Real-Time Client-Server Push Strategies: Specification and Evaluation" IEEE Computer Society Technical Committee on Real-Time Systems, 1998, pp. 179-188.

(Continued)

*Primary Examiner*—Kenneth R Coulter
(74) *Attorney, Agent, or Firm*—Kory D. Christensen; Stoel Rives LLP

(57) ABSTRACT

A system and a method for providing update information. The system includes a client computer which is operably connected to a program information server. The program information server maintains one or more program information items. The system also includes a program selection server which allows the user to select which of the program information items are to viewed by the user. Based upon a dynamically adjustable polling period, the client computer requests the program information server to provide the client computer new program information items. The program information items include one or more media items that may be selected for viewing by a user positioned at the client computer. The client computer provides a newness indicator to the user, the newness indicator indicating to the user when one or more items of the media content is new and has not been previously viewed by the user.

25 Claims, 7 Drawing Sheets

U.S. PATENT DOCUMENTS

| | | | |
|---|---|---|---|
| 5,493,728 | A | 2/1996 | Solton et al. |
| 5,537,596 | A | 7/1996 | Yu et al. |
| 5,557,798 | A | 9/1996 | Skeen et al. |
| 5,602,582 | A | 2/1997 | Wanderscheid et al. |
| 5,619,716 | A | 4/1997 | Nonaka et al. |
| 5,635,989 | A | 6/1997 | Rothmuller |
| 5,657,072 | A | 8/1997 | Aristides et al. |
| 5,666,293 | A | 9/1997 | Metz et al. |
| 5,682,533 | A | 10/1997 | Siljestroemer |
| 5,696,898 | A | 12/1997 | Baker et al. |
| 5,706,435 | A | 1/1998 | Barbara et al. |
| 5,710,884 | A | 1/1998 | Dedrick |
| 5,717,923 | A | 2/1998 | Dedrick |
| 5,732,275 | A | 3/1998 | Kullick et al. |
| 5,734,898 | A | 3/1998 | He |
| 5,740,549 | A | 4/1998 | Reilly et al. |
| 5,742,829 | A | 4/1998 | Davis et al. |
| 5,752,042 | A | 5/1998 | Cole et al. |
| 5,758,342 | A | 5/1998 | Gregerson |
| 5,764,992 | A | 6/1998 | Kullick et al. |
| 5,768,539 | A | 6/1998 | Metz et al. |
| 5,790,796 | A | 8/1998 | Sadowsky |
| 5,790,856 | A | 8/1998 | Lillich |
| 5,805,824 | A | 9/1998 | Kappe |
| 5,809,251 | A | 9/1998 | May et al. |
| 5,809,287 | A | 9/1998 | Stupek et al. |
| 5,826,253 | A | 10/1998 | Bredenberg |
| 5,832,275 | A | 11/1998 | Olds |
| 5,832,487 | A | 11/1998 | Olds et al. |
| 5,838,314 | A | 11/1998 | Neel et al. |
| 5,845,077 | A | 12/1998 | Fawcett |
| 5,845,090 | A | 12/1998 | Collins, III et al. |
| 5,848,397 | A | 12/1998 | Marsh et al. |
| 5,850,518 | A | 12/1998 | Northrup |
| 5,861,883 | A | 1/1999 | Cuomo et al. |
| 5,862,325 | A | 1/1999 | Reed et al. |
| 5,867,714 | A | 2/1999 | Todd et al. |
| 5,870,610 | A | 2/1999 | Beyda |
| 5,886,995 | A | 3/1999 | Arsenault et al. |
| 5,889,963 | A | 3/1999 | Gopal et al. |
| 5,938,729 | A | 8/1999 | Cote et al. |
| 5,946,690 | A | 8/1999 | Pitts |
| 5,963,264 | A | 10/1999 | Jackson |
| 5,974,454 | A | 10/1999 | Apfel et al. |
| 6,008,802 | A | 12/1999 | Iki et al. |
| 6,038,601 | A | 3/2000 | Lambert et al. |
| 6,057,890 | A | 5/2000 | Virden et al. |
| 6,061,722 | A | 5/2000 | Lipa et al. |
| 6,117,188 | A | 9/2000 | Aronberg et al. |
| 6,173,323 | B1 | 1/2001 | Moghe |
| 6,271,893 | B1 | 8/2001 | Kawaguchi et al. |
| 6,282,569 | B1 | 8/2001 | Wallis et al. |
| 6,308,214 | B1 | 10/2001 | Plevyak et al. |
| 6,337,719 | B1 | 1/2002 | Cuccia |
| 6,353,869 | B1 | 3/2002 | Ofer et al. |
| 6,445,306 | B1 | 9/2002 | Trovato et al. |
| 6,449,663 | B1 | 9/2002 | Carney et al. |
| 6,515,968 | B1 | 2/2003 | Combar et al. |
| 6,536,041 | B1 | 3/2003 | Knudson et al. |
| 6,574,657 | B1 | 6/2003 | Dickinson |
| 6,603,488 | B2 | 8/2003 | Humpleman et al. |
| 6,658,661 | B1 | 12/2003 | Arsenault et al. |
| 6,675,385 | B1 | 1/2004 | Wang |
| 6,701,526 | B1 | 3/2004 | Trovato |
| 6,742,186 | B1 | 5/2004 | Roeck |
| 6,744,780 | B1 | 6/2004 | Gu et al. |
| 6,996,627 | B1 * | 2/2006 | Carden ........................ 709/237 |

FOREIGN PATENT DOCUMENTS

| | | | |
|---|---|---|---|
| WO | WO 9857497 A1 | 12/1998 | |

OTHER PUBLICATIONS

Yun-Wu Huang and Philip S. Yu, "A Bandwidth-Sensitive Update Scheduling Method for Internet Push" IEEE Computer Society Technical Committee on Distributed Processing, May 1998, pp. 303-310.

Cliff Berg, "How Do I Create a Signed Castanet Channel?" Dr. Dobb's Journal, Jan. 1998, pp. 121-130.

Ling Liu et al., "CQ: A Personalized Update Monitoring Toolkit" Sigmod '98—Proceedings of ACM Sigmod International Conference on Management of Data, Jun. 1998, pp. 547-549.

Cliff Berg, "How Can I Create a Push Java Channel?" Dr. Dobb's Journal, May 1997, pp. 99-103.

Barry Nance, "When Push Comes to Serve" BYTE, Jul. 1998, pp. 98-102.

Pete Loshin, "Tune In, Turn on the Web" BYTE, Feb. 1997, pp. 145-146.

Michael Fisk, "Automating the Administration of Heterogeneous LANs" USENIX Association—Proceedings of the Tenth Systems Administration Conference Sep.-Oct. 1996, pp. 181-186.

Peter W. Osel and Wilfried Gansheimer, "OpenDist—Incremental Software Distribution" USENIX Association—Proceedings of the Ninth Systems Administration Conference, Sep. 1995, pp. 181-193.

Atsushi Futakata, "Patch Control Mechanism for Large Scale Software" USENIX Association—Proceedings of the Ninth Systems Administration Conference, Sep. 1995, pp. 213-219.

Thomas Eirich, "Beam: A Tool for Flexible Software Update" LISA, Sep. 1994, pp. 75-82.

John Lockard and Jason Larke, "Synctree for Single Point Installation, Upgrades, and OS Patches" USENIX Association—Proceedings of the Twelfth Systems Administration Conference, Dec. 1998, pp. 261-270.

Ram R. Vangala et al., "Software distribution and Management in a Networked Environment" USENIX Association—Proceedings of the Sixth Systems Administrative Conference, Oct. 1992, pp. 163-170.

Bobby Krupczak, et al., "Implementing Protocols in Java: The Price of Portability" IEEE Infocom '98, vol. 2, pp. 765-773.

* cited by examiner

SYSTEM AND METHOD FOR PROVIDING UPDATE INFORMATION

CROSS-REFERENCE TO RELATED APPLICATIONS

The application is a continuation of U.S. patent application Ser. No. 09/318,755, filed May 25, 1999, by Carden, and entitled "SYSTEM AND METHOD FOR PROVIDING UPDATE INFORMATION", which issued Feb. 7, 2006 as U.S. Pat. No. 6,996,627.

BACKGROUND OF THE INVENTION

1. Field of the Invention

The invention pertains to automatic computer upgrading. More particularly, the invention pertains to a system and method for updating program information items via a network.

2. Description of the Related Technology

As the popularity of the Internet increases, users are turning from traditional media sources, such as television and newspaper, to the Internet to obtain information about current news events, activities, entertainment and other information. By using a client program which resides on a client computer, a user can visit one of many media servers that contain information which is provided by various content providers. A typical media server may include a plurality of web pages that are viewable by a user at the client computer. The web pages are virtual documents often having embedded links which link portions of the virtual pages to other virtual pages and other data. A user can traverse the virtual pages and download data by selecting with a mouse or other input device a predetermined portion of the virtual page enabled as a link.

Traditionally, the client program has been an Internet browser that allows a user to visit various web pages by providing an address of a selected media server. More recently, however, client programs provide for the automatic downloading and playback of selected items of information to the client computer. As an example, various media servers have been developed offering various "streamable" programs. The term streamable refers to media that can be transmitted from one computer to another, and played in real time as the media is received. A streamable program can include any type of audiovisual presentation, such as, for example, a news report, an entertainment show, a picture, text, or an advertisement.

As a service to the user, the media server provides information about each of the streamable programs to the user so that the user may make an informed selection from the available programs. These media servers are designed to periodically update the client computer with the latest set of program information as it is accumulated.

However, these media servers have encountered difficulty servicing large numbers of users. Some popular media servers may service thousands of client computers. When a content provider desires to make new programming available on the media server, the content provider needs to send the new information each of the new users. Disadvantageously, such an update can cause network congestion within selected portions of the Internet network and consume network resources. Network congestion may cause network packets representing portions of the streamable program to be lost and also impair other communications that are being transmitted over the Internet.

Therefore, there is a need for an improved system for distributing information from a media server to a client computer. The system should minimize the amount of network congestion that is caused by an update from a server computer to a client computer.

SUMMARY OF THE INVENTION

The present invention has several aspects, no single one of which is solely responsible for its desirable attributes. Without limiting the scope of this invention as expressed by the claims which follow, its more prominent features will now be discussed briefly.

One embodiment of the invention includes a method of dynamically adjusting the polling frequency of a client computer, the method comprising sending a polling interval from a server to a client computer, periodically determining whether the server has new program information items, the determining period based at least in part upon the polling interval, and transmitting new program information items to the media renderer upon the determination that the media server has new program information items.

Another embodiment of the invention includes a system for updating program information items on a client computer, the system comprising a network, a server computer, and a client computer periodically determining whether the server has new program information items, the determining period based at least in part upon an polling interval that is provided by the server computer.

Yet another embodiment of the invention includes a system for dynamically adjusting the polling frequency of a client computer, the system comprising means for sending an polling interval from a server to a client computer, means for periodically determining whether the media server has new program information items, the determining period based at least in part upon the polling interval, and means for transmitting new program information items to the media renderer upon the determination that the media server has new program information items.

Yet another embodiment of the invention includes a system for delivering custom media content to a client computer, the system comprising a network, at least one media content provider, each of the at least one media content provider operably connected to the network, a client computer operably connected to the network, opaque data residing on the client computer, the opaque data being associated with one of the at least one media content provider, a server computer configured to retrieve the opaque data from the client computer and forward the opaque data to the media content provider that is associated with the opaque data.

Yet another embodiment of the invention includes a system for delivering custom media content to a client computer, the system comprising means for receiving a request from a client computer for new information, means for determining whether the client computer has any opaque data that is associated with the new information, means for identifying a media content provider that is associated with the opaque data, means for transmitting the opaque data to the media content provider, and means for customizing the new information based upon the opaque data, and means for sending the new information from the media content provider to the client computer.

Yet another embodiment of the invention includes a method of displaying program information items, the method comprising determining that a media server has one or more new program information items, and displaying a content indicator to a user, the content indicator identifying to the user that one or more new program information items are available for presentation.

Yet another embodiment of the invention includes a system for updating information to a client computer, the system comprising a network, a server computer operably connected to the network, and a client computer operably connected to the network, the client computer periodically receiving updates from the server, the client computer displaying a content indicator to a user indicating that one or more program information items is accessible by the user upon receipt of each of the updates, the client computer retrieving the program information items from a media content provider upon a request of the user.

Yet another embodiment of the invention includes a system for displaying program information items, the system comprising means for receiving an update report from a server computer, the update report indicating that a media server has one or more new program information items, and means for displaying a content indicator to a user, the content indicator identifying to the user that one or more new program information is accessible.

Yet another embodiment of the invention includes a method for maintaining up-to-date program information, the system comprising receiving one or new program information items, each of the program information items having an associated expiration time, and extending at least one expiration time responsive to a request by a media server.

Yet another embodiment of the invention includes a program storage device storing instructions that when executed perform the steps comprising receiving one or new program information items, each of the program information items having an associated expiration time, and extending at least one expiration time responsive to a request by a media server.

DETAILED DESCRIPTION OF THE INVENTION

The following detailed description is directed to certain specific embodiments of the invention. However, the invention can be embodied in a multitude of different ways as defined and covered by the claims. In this description, reference is made to the drawings wherein like parts are designated with like numerals throughout.

System Overview

Figure 1:
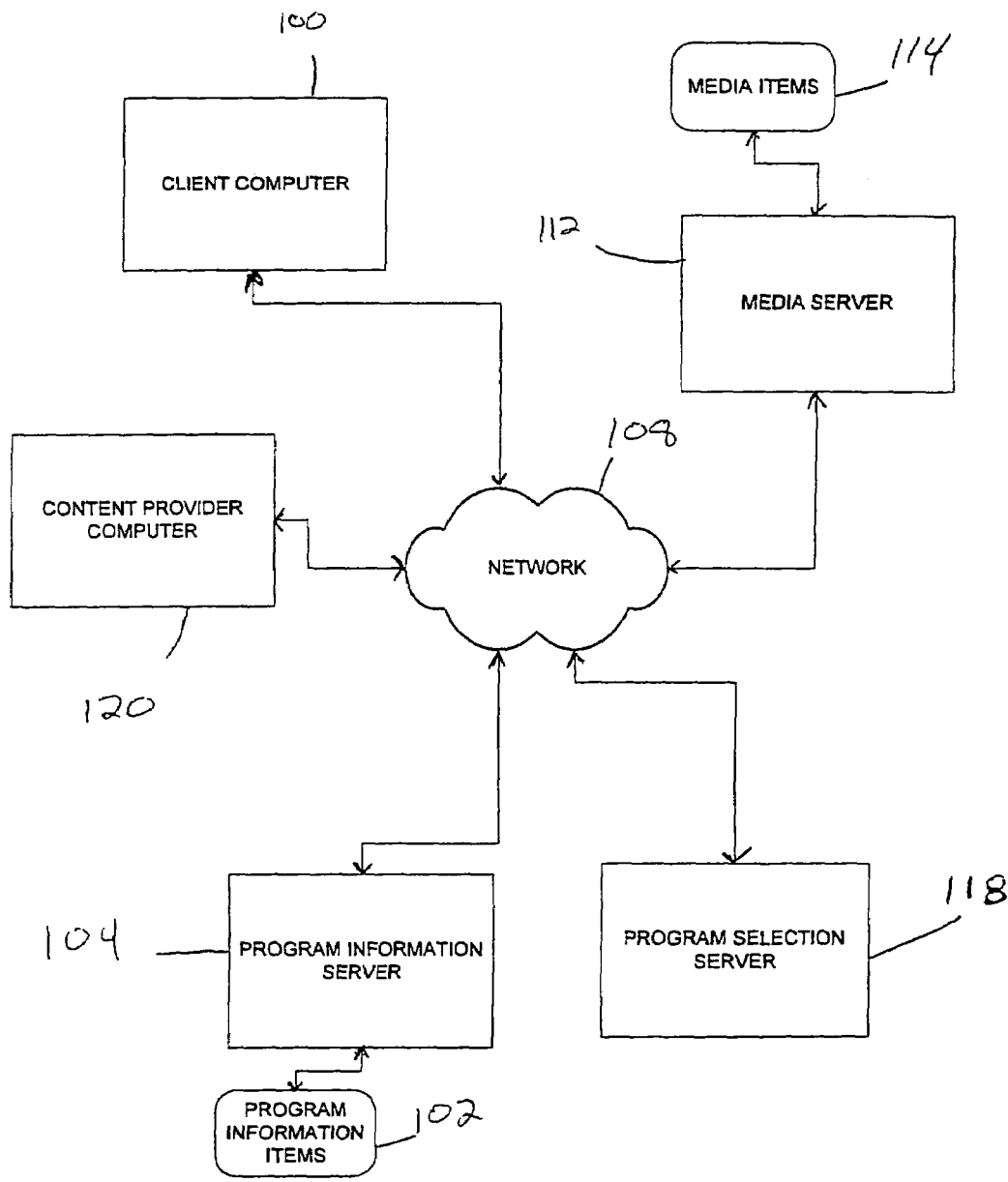
FIG. 1 is a block diagram illustrating a system for transmitting one or more program information items to a client computer.

FIG. 1 is a high-level block diagram illustrating an architectural overview of one embodiment of the present invention. The system is configured to periodically deliver program information items 102 to a client computer 100. As used herein, the term "program information items" includes any information that is subject to change over time. As a non-limiting example, the program information items 102 can include audio and visual information about current news events, cultural activities, entertainment, sports, recreation, movies, stock information, interest rates, pricing information, cartoons, advertisements, and other information that may be desired by a user. Further, the program information items 102 may include the following types of data formats: text, animation, 3-D graphics, streaming media, Joint Photographic Experts Group (JPEG) files, Motion Picture Expert Group (MPEG) files, HyperText Markup Language (HTML) files, Extensible Markup Language (XML) files, and/or any other type of data that can be associated with media content. It is also noted that the program information items 102 may include an address or a reference which identifies the location of other program information items.

Further, although only one client computer 100 is shown in FIG. 1, the present invention is capable for transmitting program information items 102 to a plurality of client computers 104 numbering in the tens of millions and upwards.

The client computer 100 is connected via a network 108 to a program information server 104. It is noted that the term "program information server" is used for convenience to describe any computer that can maintain and transmit the program information items 102. For example, the program information server 104 can be any traditional "web server" that hosts media content for viewing by users. The features of the program information server 104 are described in further detail below.

The client computer 100 and the program information server 104 are operably connected to a media server 112. The media server 112 contains one or more media items 114. The media items 114 are stored on the media server 112 until requested by a user at the client computer 100. Each of the media items 114 is associated with selected program information items 102. Further, each of the media items 114 can include any of the information as discussed above with reference to the program information items 102.

In one embodiment of the invention, the media items 114 are significantly larger in size than the size of program information items 102. In this embodiment, the media items 114 are stored by the media server 112 until requested by a user. Due to their size, the media items 114 cannot be distributed to the client computer 100 upon each update of the client computer 100. However, in this embodiment, since the program information items 102 are significantly smaller than the media items 114, the program information items 102 may be periodically transmitted to the client computer 100 even absent a specific request from the client for such information, and, advantageously, such periodic transmission does not cause network congestion.

It is noted that although only one media server 112 is shown in FIG. 1, the present invention is capable of having a plurality of media servers 112 numbering in the tens of thousands and upwards. Further, in one embodiment of the invention, each of the media servers 112 is associated with a content provider. The content provider provides selected ones of the media items 114 to the user. As a non-limiting example, a content provider can include: any type of store, e.g., book, automobile, clothing; a broadcasting company; a newspaper; a streaming content provider; or an educational services provider. The content provider can provide the media items 114 to the user either for free or for a fee.

The client computer 100 is also connected to a program selection server 118 via the network 108. The program selection server 118 contains a plurality of web pages that are viewable by a user at the client computer 100. A user at the client computer 100 informs the program selection server 118 as to which of the program information items 102 are to be displayed to the user.

The network 108 is also operably connected to a content provider computer 120. The content provider computer 120 can be used by a content provider to add, delete, and/or modify the contents of the program information items 102 on the program information server 104. Furthermore, the content provider computer 120 can be used by a content provider to add, delete, and/or modify the contents of the media items 114 on the media server 112.

Optionally, the program information server 104, the media server 112, the program selection server 118, the content provider computer 120 or some combination thereof, may be integrated into a single computer platform. Further, it is noted the program information server 104, the media server 112, the program selection server 118, the content provider computer 120 may not necessarily be located in the same room, building or complex. In fact, the program information server 104, the media server 112, the program selection server 118, and the content provider computer 120 can be located in different buildings or states.

The client computer 100, the program information server 104, the media server 112, the program selection server 118, and the content provider computer 120 may each have one or more conventional general purpose microprocessors such as a Pentium® processor, a Pentium® Pro processor, a 8051 processor, a MPS® processor, a Power PC® processor, or an ALPHA® processor. In addition, the microprocessor may be any conventional special purpose microprocessor such as a digital signal processor or a graphics processor. Furthermore, the client computer 100, the program information server 104, the media server 112, the program selection server 118, and the content provider computer 120 may each comprise a plurality of computers that are connected by a network, such as the network 108. In addition, the client computer 100, the program information server 104, the media server 112, the program selection server 118, and the content provider computer 120 may be a desktop, server, portable, hand-held, set-top, or other configured computer.

The client computer 100, the program information server 104, the media server 112, the program selection server 118, and the content provider computer 120 may each be used in connection with various operating systems such as: UNIX, LINUX, Disk Operating System (DOS), OS/2, Windows 3.X, Windows 95, Windows 98, and Windows NT.

The network 108 may include any type of electronically connected group of computers including, for instance, the following networks: Internet, Intranet, Local Area Networks (LAN) or Wide Area Networks (WAN). In addition, the connectivity to the network may be, for example, remote modem, Ethernet (IEEE 802.3), Token Ring (IEEE 802.5), Fiber Distributed Datalink Interface (FDDI) or Asynchronous Transfer Mode (ATM). As used herein, an Internet includes network variations such as public internet, a private internet, a secure internet, a private network, a public network, a value-added network, an intranet, and the like. The network 108 may include multiple network technologies including both high and low bandwidth connections. The network 108 may include non-persistent connections that are only available at intervals, e.g., dial up telephone lines, and may also include persistent connections.

As can be appreciated by one of ordinary skill in the art, each of the program information server 104, the media server 112, the program selection server 118, and the content provider computer 120 includes a control program (not shown) that controls the operation of the respective computer. Each of the control programs comprise various sub-routines, procedures, definitional statements, and macros. As will be appreciated by one of ordinary skill in the art, each of the control programs can be divided into several components which are linked together or made available in a shareable dynamic link library. Furthermore, the control programs may be written in any programming language such as C, C++, BASIC, Pascal, Java, and FORTRAN. C, C++, BASIC, Pascal, Java, and FORTRAN are industry standard programming languages for which many commercial compilers can be used to create executable code.

Figure 2:
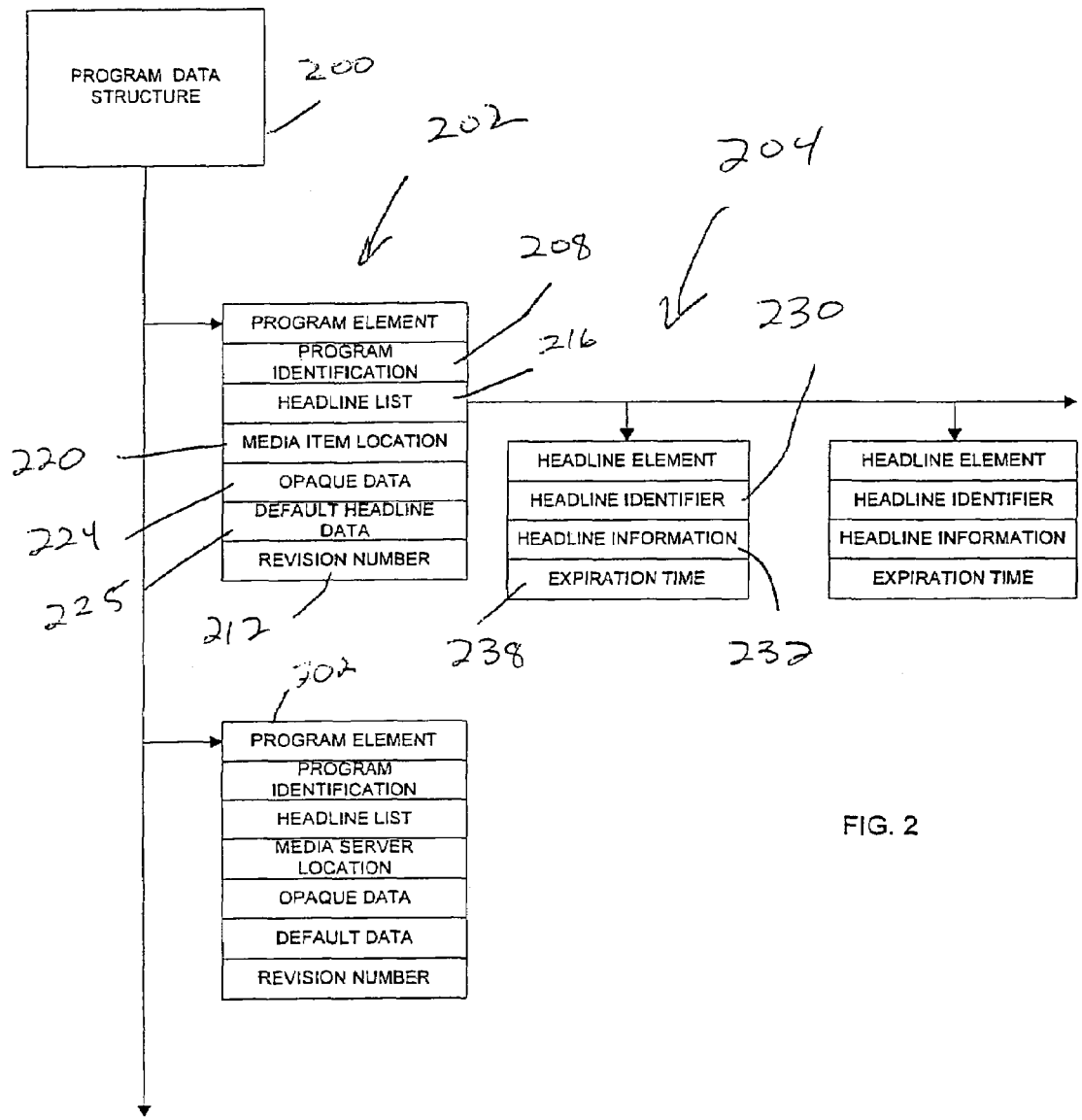
FIG. 2 is a block diagram of a data structure which is stored in the client computer of FIG. 1, the data structure indicating which of the program information items are to be presented to the user.

FIG. 2 is a block diagram illustrating the elements of one embodiment of a program data structure 200 which resides on the client computer 100. The program data structure 200 contains some of the program information items 102 as well as identifies the location of other program information items 102, such as the media items 114 (FIG. 1). The program data structure 200 includes a plurality of program elements 202 that are each associated with a content provider. It is noted that some content providers may be associated with multiple program elements 202. For example, the XYZ Broadcasting Company ("XYZ") may provide two types of media content: sports and entertainment. In this example, XYZ would have two program elements 202, one associated with XYZ's sports content, the other associated with XYZ's entertainment content. It is noted that although FIG. 2 only displays two program elements 202, the program data structure 200 may be adapted to contain any number of program elements 202.

Each of the program elements 202 includes a number of data fields. As will be readily appreciated by one of ordinary skill in the art, the program elements 202 can be defined using any type of data structures having data fields. For example, the program elements 202 can be defined as arrays, linked lists, or other data structures. Each of the program elements 202 includes a program identification data field 208. The program identification data field 208 contains a program identifier that uniquely identifies the program element 202. The program identifier can be any arbitrary sequence of characters that uniquely identifies the program element 202.

Each of the program elements 202 also includes a revision number data field 212. The revision number data field 212 contains a revision number for the respective program element 202. In one embodiment of the invention, the revision number is an integer. In this embodiment, the higher the revision number value of the program element 202, the more recent is the information of the program element 202.

Each of the program elements 202 also includes a headline list data field 216. The headline list data field 216 identifies one or more headline elements 204. The headline elements 204 are described in further detail below.

Further, the program elements 202 also include a media item location data field 220. The media item location data field 220 identifies the location of additional information that may be delivered to the client pursuant to a client request. For example, in one embodiment of the invention, the media identification data field 220 contains an Uniform Resource Locator (URL) that identifies one of media items 114.

In addition, the program elements 202 may optionally include an opaque data field 224. The opaque data field 224 includes information that may be customized by any content provider associated with the program element 202. The opaque data field 224 allows the content provider to customize the information that is presented to the user as well as customizing the media content itself based upon the opaque data. The opaque data includes information that is specific to a user, such as a list of interests.

The program elements 202 also include a default headline data field 225. The default headline data field 225 contains information that is displayed to a client at the client computer 100 if all of the headline elements 204 that are identified in the headline list data field 216 are expired.

Each of the headline elements 204 includes headline information that is to be presented to the user. As discussed above, each of the headline elements 204 is associated with at least one of the program elements 202.

Each of the headline elements 204 includes a headline identifier data field 230, a headline information data field 232 and an expiration data field 338. The headline identifier data field 230 uniquely identifies the headline element 204. The headline information data field 232 includes or identifies headline information that is to be presented to the user. In one embodiment of the invention, the headline information is stored in the headline information data field. In another embodiment of the invention, a location of the headline information is identified in the headline information data field. The headline information can include any of the information which is described above with reference to the program information items 102.

Each of the headline elements 204 also includes an expiration time data field 238. The expiration time data field 238 identifies an expiration time after which the headline information is no longer timely.

Figure 3:
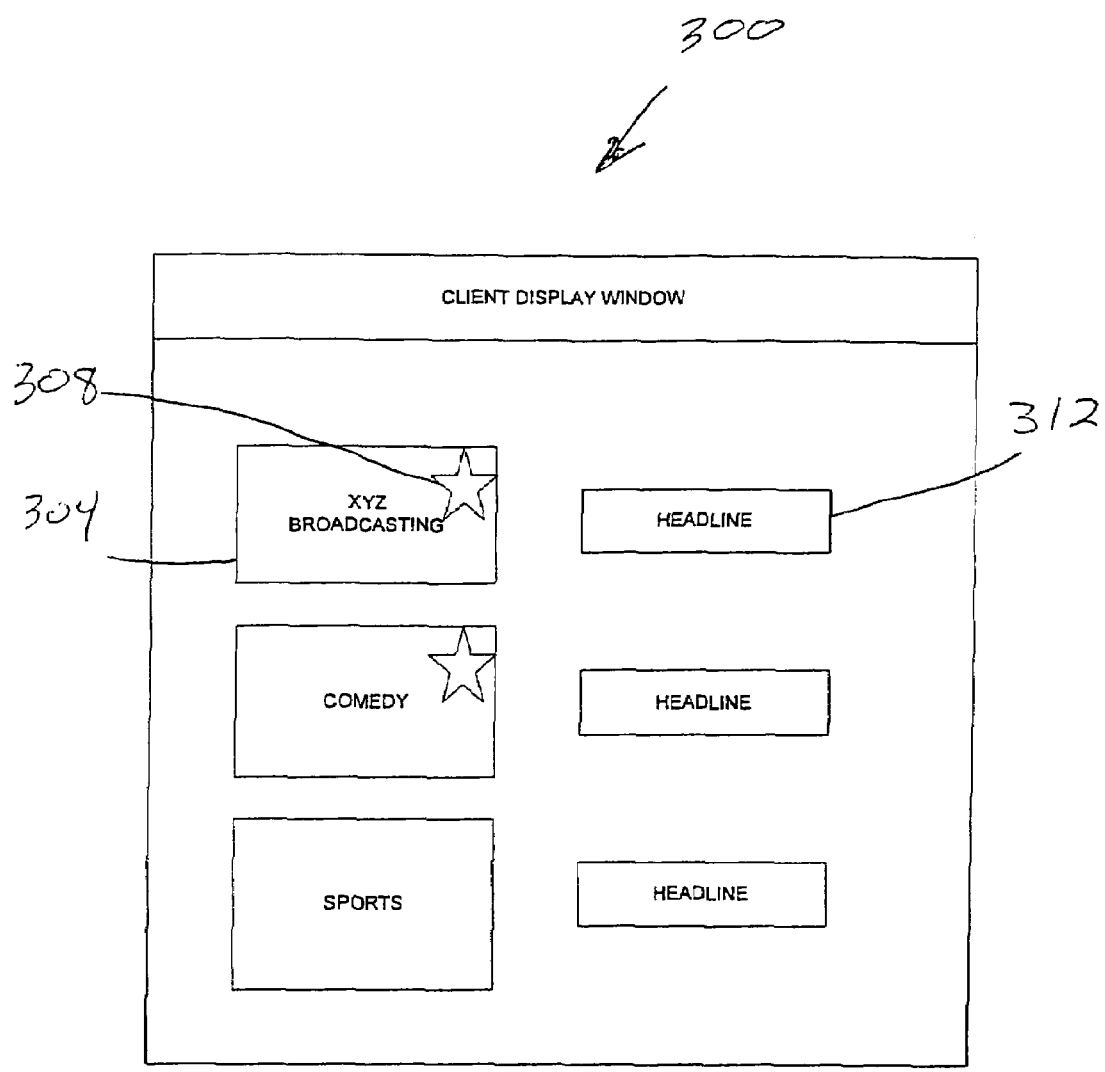
FIG. 3 is an exemplary screen display of the client computer of FIG. 1, the screen display illustrating selected ones of the program information items.

FIG. 3 is an exemplary screen display 300 that is presented to a user at the client computer 100. The screen display 300 includes a plurality of graphical elements 304. Each of the graphical elements 304 is associated with one of the program elements 202 (FIG. 2). The graphical elements 304 can contain a label which identifies a content provider. Using the example from above, it can be assumed that XYZ is associated with one of the graphical elements 304. As is shown in FIG. 3, the graphical element 304 has a label specifying "XYZ Broadcasting."

Each of the graphical elements 304 also has an associated newness indicator 308. The newness indicator 308 may be located on or near a graphical element to identify to a user its association with a respective graphical element. The newness indicator 308 is displayed to a user when one or more not previously viewed new media items 114 is available for presentation to the user. It is noted that although a star is used in connection with FIG. 3, the newness indicator can be of any form, such as a square, a circle, a highlighted item of text, an audio signal, an arrow, or other such indicia.

Each of the graphical elements 304 also has a presentation area 312. The presentation area 312 is used to display the headline data that is contained in the headline information data field 232 (FIG. 2). It is noted, that if the headline information data field 232 contains audio data, such audio data can be rendered into sound and transmitted to the user via one or more speakers (not shown) subsequent to a user request.

If all of the headline information that is contained within the headline elements 204 cannot be formatted to be displayed in the presentation area 312, the client computer 100 can either resize the presentation area 312 and/or present in sequence the information that is contained within each of the headline information data fields 232.

In one embodiment of the invention, each of the graphical elements 304 is selectable by a user via input device, such as a mouse. Upon selection, the client computer 100 downloads the media content that is identified in the media item location data field 220 which is associated with the graphical element 304.

Method of Operation

Figure 4:
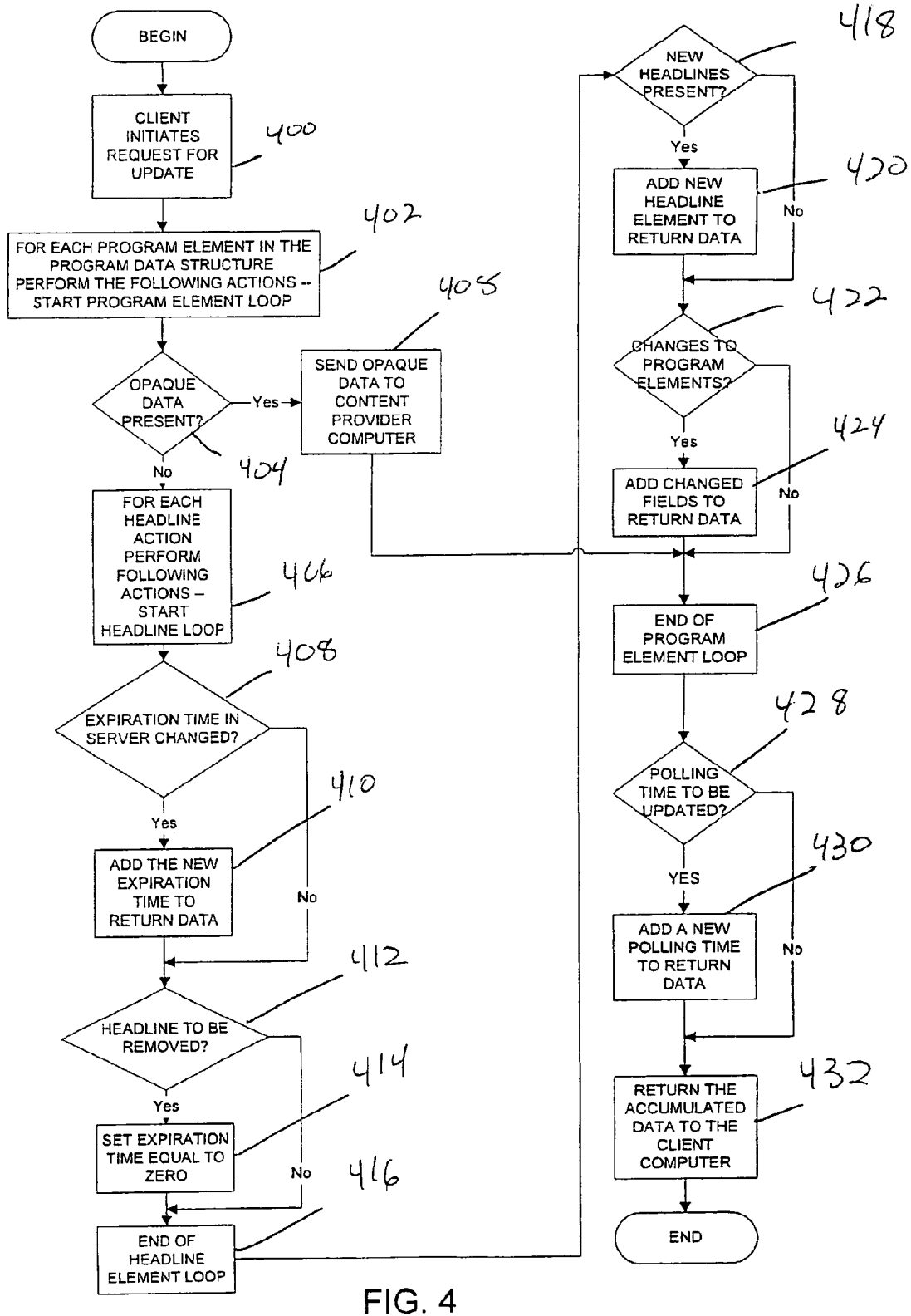
FIG. 4 is a flowchart illustrating a process for transmitting new program information items to the client computer of FIG. 1.

FIG. 4 is a high level flowchart illustrating a process for transmitting new program information items 102 to the client computer 100 (FIG. 1). The client computer 100 periodically polls the program information server 102 at programmably definable time intervals. FIG. 4 describes the update process that occurs upon the expiration of the time interval.

Starting at a step 400, the client computer 100 initiates a request to the program information server 104 for the most recent program information items 202. To inform the program information server 102 which of the program elements 202 are associated with the client computer 100, at the step 400, the client computer 100 transmits a number of items to the program information server 104, including: (i) each of the program identification numbers (identified in the program identification data field 208 of FIG. 2), (ii) the revision number associated with each of the program elements 202 (identified in the revision number data field 212 of FIG. 2), (iii) a list of the headline identification numbers (identified in each of the headline identifier data fields 230 of FIG. 2), and (iv) and any opaque data that is associated with the program elements 202.

Continuing to a step 402, the program information server 104 performs a loop of steps (steps 404-426) with respect to each of the program elements 202 (FIG. 2). During each pass of the loop, one of the program elements 202 is successively selected for processing. For convenience of description, the following description with respect to steps 404-426 is described below with respect to only one of the program elements 202.

Moving to a decision step 404, the program information server 104 determines whether the opaque data field 224 (FIG. 2) of the currently selected program element 202 includes any data. If the opaque data field 224 does include data, the program information server 104 proceeds to a step 405. At the step 405, the program information server 405 sends the content provider computer 120 the opaque data and passes control of the update to the content provider computer 120. The content provider computer 120 can then directly handle the update request with the client computer 100, or, alternatively, prepare an update for the client computer 100 and forward the update to the program information server 104 which can then respond to the client computer 100.

Advantageously, the use of opaque data enables the content provider to customize the information that is presented to the user based upon the contents of the opaque data. Furthermore, the use of the opaque data allows for the reduction of the storage requirements of the program information server 104 and also allows for increased privacy for the content provider since the program information server 104 has no access to opaque data updates. From the step 405, the process flow proceeds to a step 426 which is described in further detail below.

Referring again to the decision step 404, if the opaque data field 224 does not contain any data, the program information server 104 proceeds to a step 406. At the step 406, the program information server 104 begins an iterative loop. During the steps 408-426, the program information server 104 (FIG. 1) successively processes each of the headline elements 204 that are associated with the currently selected program element 202 (FIG. 2). For convenience of description, the following description with respect to steps 408-426 describes the process flow with respect to only one of the headline elements 204.

Proceeding to a decision step 408, the program information server 104 (FIG. 1) determines whether the expiration time identified in the headline expiration data field 238 of the currently selected headline element 204 is still later than the present time, in other words, whether the headline element 204 is still "fresh." As used herein, the term fresh is used to describe current information regarding a data item. If the headline element 204 is fresh, the program information server 104 proceeds to a decision step 412. However, if it is not fresh, the program information server 104 proceeds to a step 410. At the step 410, the program information server 104 resets the expiration time that is associated with the headline element 204. The expiration time is used by the client computer to determine the lifespan of a headline element. For example, a headline element 204 that included the current offer price of a stock may have a very short lifespan. Conversely, a headline element 204 that included the name of the winner of a governmental election would likely have a longer lifespan. At this step, the program information server 104 can extend or shorten the lifespan of a headline article depending on the circumstances.

If at the step 408, the expiration time in the program information server 104 did not change, or after completing the step 410, the program information server 104 proceeds to a decision step 412. At the decision step 412, the program information server 104 determines whether the headline element 204 is to be deleted. One or more of the headline elements 204 can be deleted pursuant to a request from the content provider computer 120. If the headline element 204 is to be deleted, the program information server 104 proceeds to step 414. At the step 414, the program information server 104 sets the expiration time of the respective headline element 204 to any time in the past, for example, a year zero. The program information server 104 then proceeds to a step 416.

Referring again to the decision step 412, if the headline element 204 is not to be deleted, or after performing the step 414, the program information server 104 proceeds to a step 416. At the step 416, the program information server 104 has completed processing one of the headline elements 204. The program information server 104 then returns to the step 406 to continue to processing the next headline element 204. The steps 406-416 are repeated with respect to a new headline element 204 until all of the headline elements 204 have been processed.

Moving to a decision step 418, the program information server 104 (FIG. 1) determines whether any new headline elements 204 are to be transmitted to the client computer 100. A content provider at the content provider computer 120 (FIG. 1) can access the program information server 104 (FIG. 1) to add new headline elements 204 (FIG. 2) to the program information server 104.

If the program information server 104 determines that additional headline elements 204 (FIG. 2) are to be transmitted to the user, the program information server 104 proceeds to a step 420. At the step 420, the program information server 104 adds a new headline element to the information that is to be returned to the client computer 100.

Referring again to the decision step 418, if the program information server 104 (FIG. 1) determines that there are no new headline elements, or after completing the step 420, the program information server 104 proceeds to a decision step 422. At the decision step 422, the program information server 104 determines whether any changes have been made by the content provider with respect to any of the program elements 202 (FIG. 2). If any changes have been made, the program information server 104 proceeds to a step 424.

At the step 424, the program information server 104 adds the changed program elements to the information which is to be returned to the client computer 100 (FIG. 1). For example, at the step 424, the contents of the default headline data field 225 (FIG. 2) can be modified if a new default headline is desired. Also for example, the contents of the media item location data field 220 can be modified to reference a different media item 114 (FIG. 1).

Referring again to the decision step 422, if the program information server 104 (FIG. 1) determines that there are no changes to the program elements 202 (FIG. 2), or, alternatively, after completing the step 424, the program information server 104 proceeds to a step 426. At the step 426, the program information server 104 has completed processing one of the program elements 202. The program information server 104 then returns to the step 402 to process the next program element 204. The steps 404-426 are repeated until all of the program elements 202 have been processed.

From the step 426, the program information server 104 proceeds to a decision step 428. At the decision step 428, the program information server 104 determines whether the polling time of the client computer 100 is in need of updating. The polling time of the client computer 100 can be adjusted either upwards or downwards in time based upon the preferences of the provider of the program information server 104. For example, in times of breaking news, the polling interval can be decreased such that updates occur more frequently. Further, if the program information server 104 becomes overloaded with update requests from users, the polling interval can be increased such that updates occur less frequently. In addition, the polling interval can be increased or decreased based upon the program elements 202 which have been selected by the user at the client computer 100. If the headline elements 204 associated with a program element 202 are modified frequently, the polling interval can be decreased to minimize the time in which the user views data that is not fresh.

If the polling time needs to be updated, the program information server 104 proceeds to a step 430. The polling time interval may be determined by the system administrator of the program information server 104, or, alternatively, by applying an algorithm to the list of program elements 202 in the program data structure 200. At the step 430, the program information servers adds a new polling interval to the information that is to be returned to the client computer 100.

Referring again to the decision step 428, if the polling interval does not need to be updated, or after performing the step 430, the program information server 104 (FIG. 1) proceeds to a step 432. At the step 432, the program information server 102 transmits the information that has been accumulated during steps 402-430 to the client computer 100.

Figure 5:
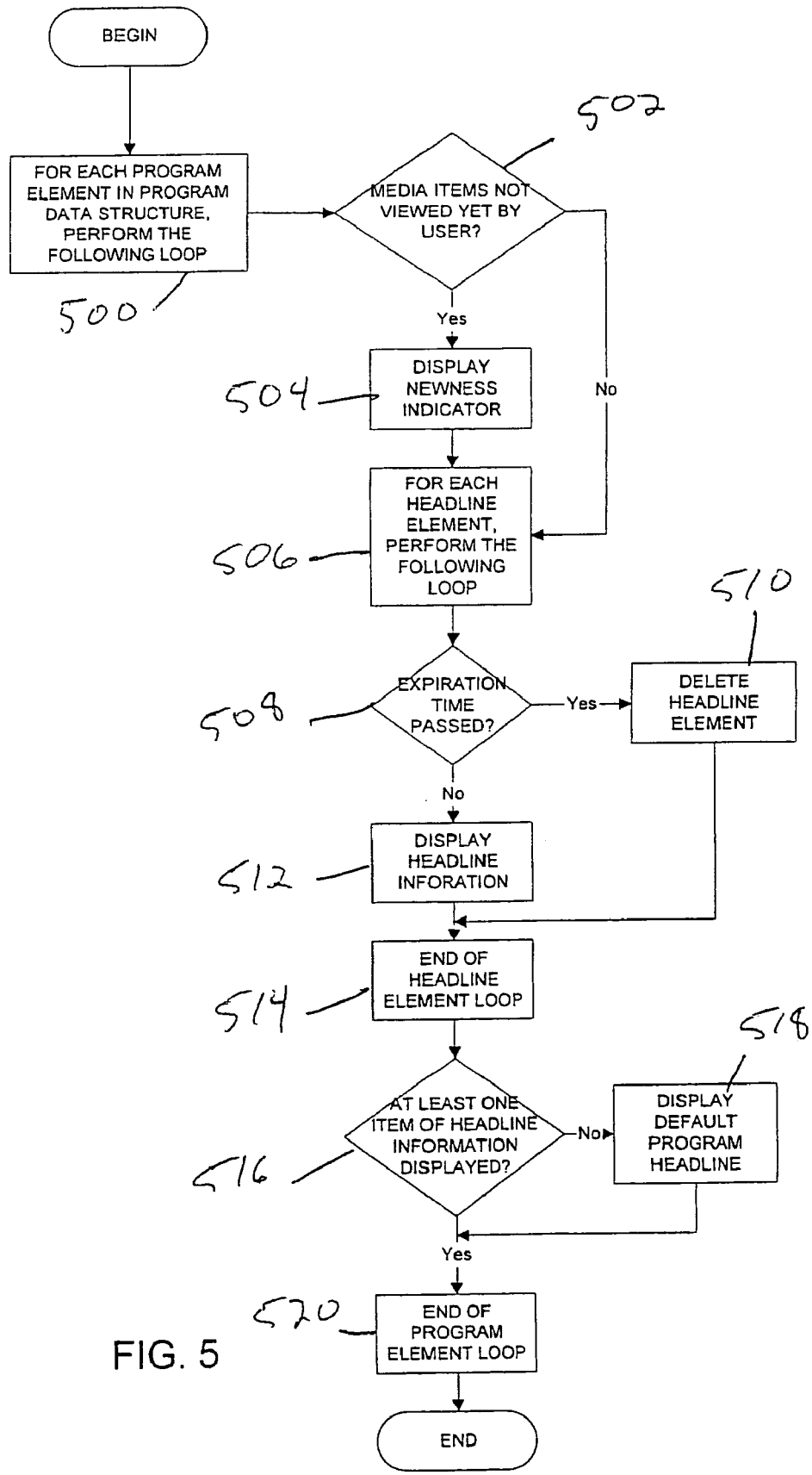
FIG. 5 is a flowchart illustrating a process for displaying a newness indicator on the screen display on the client computer of FIG. 1, the newness indicator indicating the presence of one or more media items that may be viewed by the client at the client computer.

FIG. 5 is a flowchart illustrating the process that occurs on the client computer 100 subsequent to receiving an update from the program information server 104. Starting at a step 500, the client computer 100 performs a series of steps with respect to each of the program elements 202 (FIG. 2) that are contained within the program data structure 200 (FIG. 2). The client computer 100 performs the steps 500-520 with respect to each of the program elements 202. For convenience of description, the processing of program elements 202 is described below with respect to only one of the program elements 202.

After starting at the step 500, the client computer 100 (FIG. 1) proceeds to a decision step 502. At the decision step 502, the client computer 100 determines whether the user has viewed the most recent version of the media items 114 available in connection with the currently selected program element 202. It is noted that the client computer 100 stores the revision number identified in the revision number data field 212 of the program element 202 each time the user selects one of the media items 114 (FIG. 1) associated with the program element 202. If the client computer 100 determines that a later version of the media content 114 is available for transmission to the user, the client computer 100 proceeds to a step 504. At the step 504, the client computer 100 presents the newness indicator 308 (FIG. 3) to the user. For example, by rendering a shape such as a star on the display.

Referring again to the step 502, if the client computer 100 determines that the user has seen the most recent version of the media items 114 associated with the currently selected program element 202, or, after completing the step 504, the client computer 100 proceeds to a step 506. At the step 506, the client computer 100 performs the steps 508-516 with respect to each of the headline elements 202. For convenience of description, the process flow is described below with respect to only one of the headline elements 202.

Proceeding to a step 508, the client computer 100 determines whether the expiration time identified in the expiration time data field 238 has been passed. If so, the client computer 100 proceeds to a step 510, wherein the client computer removes the headline element from the program data structure 200 (FIG. 2).

However, referring again to the decision step 508, if the client computer 100 (FIG. 1) determines the expiration time has not been passed, the client computer 100 proceeds to a step 512. At the step 512, the client computer 100 displays the headline information that is identified in the headline information data field 232 (FIG. 2).

From either the step 510 or the step 512, the client computer 100 proceeds to a step 514. At the step 514, the client computer 100 has finished processing one of the headline elements 204 that is associated with one of the program elements 202. The client computer 100 then, if necessary, repeats the steps 506-514 with respect to any remaining unprocessed headline elements 204.

Continuing to a decision step 516, the client computer 100 determines whether the contents of at least one of the headline information data fields 230 (FIG. 2) was displayed to a user at the client computer 100. If no headline was displayed, the client computer 100 proceeds to a step 518. At the step 518, the client computer 100 displays the information that is contained within the default headline data field 225.

Referring again to the decision step 516, if at least the contents of one of the headline information data fields 230 was presented to the user, or after performing the step 518, the client computer 100 proceeds to a step 520.

At the step 520, the client computer 100 returns to the step 500 to process any remaining program elements 202. After all of the program elements 202 have been processed, the client computer 100 stops and awaits further action by the user, such as selection of one of the graphical elements 304 which may start the transmission of the media items 114 (FIG. 1).

Figure 6:
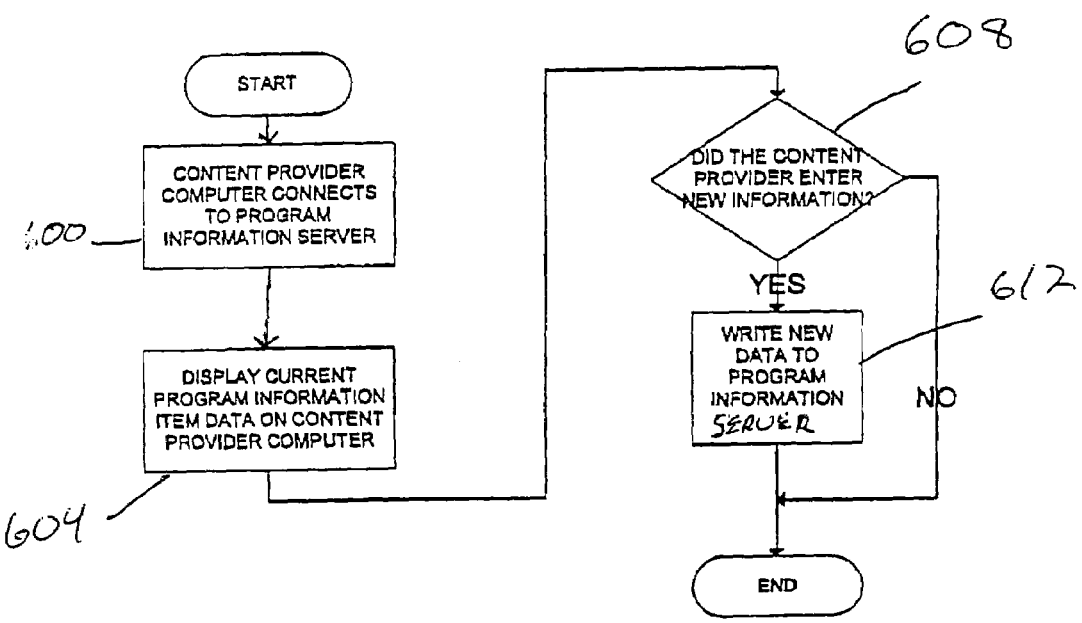
FIG. 6 is a flowchart illustrating a process for updating the program information items of FIG. 1.

FIG. 6 is a flowchart illustrating the process for updating the information that is stored in the program information server 104. Starting a step 600, a content provider residing at the content provider computer 120 (FIG. 1) connects to the program information server 104. As will be appreciated by one of ordinary skill in the art, a number of methods exist for establishing a communication channel between two computers, e.g., TCP/IP.

Next, at a step 604, the program information server 104 displays to the content provider at the content provider computer 120 the current state of the program information items 102 (FIG. 1) maintained by the program information server 104. For example, using the example from above, and assuming the current headline for XYZ was "New widget available now.", the content provider would be presented the headline "Sew widget available now."

Continuing to a decision step 608, the program information server 104 determines whether the content provider wants to modify any of the program information items 102 (FIG. 1). In one embodiment, at the decision step 608, the program information server 102 displays a menu that enables the user to select from the program information items 102 (FIG. 2) any that the user wants to modify.

If the content provider did not modify any of the program information items 102, the process ends. However, if the user/content provider modified any of the program information items 102, the program information server 104 proceeds to a step 612. At the step 612, the program information server 104 stores the information, such that when a client computer 100 requests for an update, the client computer 100 is presented with the most recent information. The content provider update process then ends.

Figure 7:
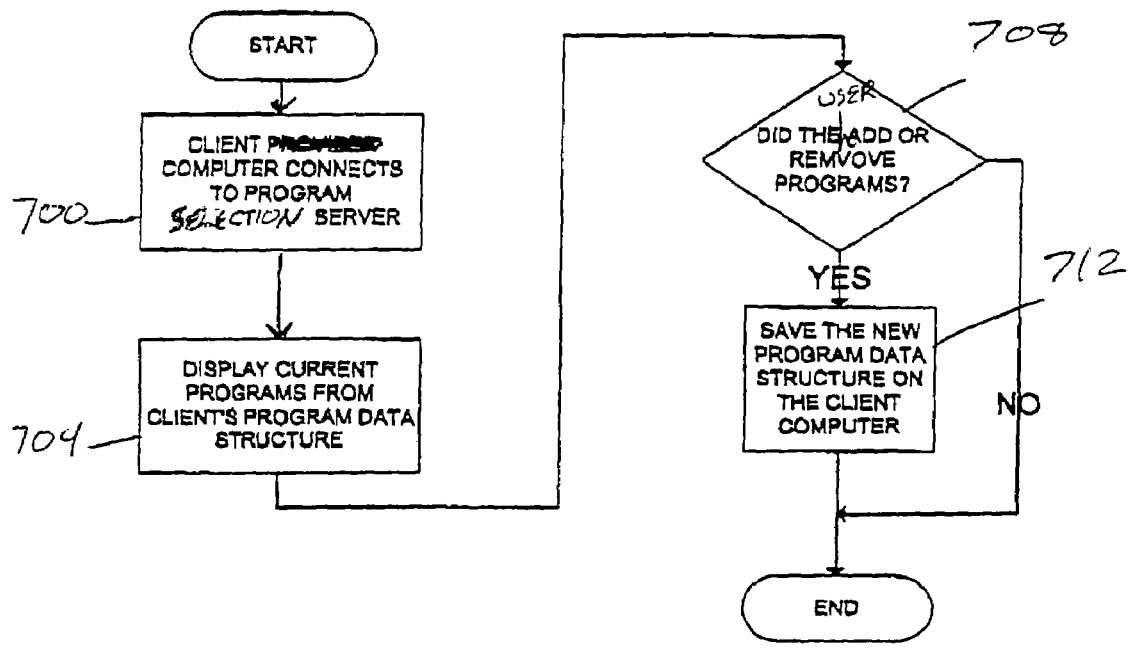
FIG. 7 is a flowchart illustrating a process for selecting the program information items which are displayed to the client computer of FIG. 1.

FIG. 7 is a flowchart illustrating a process for selecting which of the program information items 102 are to be presented to the client computer 100. Starting a step 700, a user residing at the client computer 100 (FIG. 1) desires to modify the set of program information items 102 presented to the user. At this step, the client computer 100 connects to the program selection server 118. As will be appreciated by one of ordinary skill in the art, a number of methods exist for establishing a communication channel between two computers.

Proceeding to a step 704, the program selection server 118 presents to the user each of the program information items 102 which currently selected by the user at the client computer 100. In one embodiment of the invention, the program selection server 118 presents a screen display similar to the screen display which is shown in FIG. 3.

Continuing to a decision step 708, the user can modify the program information items 102 which are transmitted to the user upon each update. In particular, at this step, the user can add to or delete from a current lineup the program elements 202 which are in the program data structure 200. It is noted that there exists a number of methods for determining which of the program elements 202 are desired by the user. For example, the program selection server 118 can present a master list that identifies each of the program elements 202 that can be selected by the user. The user can select with an input device which of the program elements 202 are to be added to a lineup data structure. Conversely, the user can remove any of the program elements 202 that are currently in the lineup by simply selecting with the input device the respective program element 202.

Optionally, the program selection server 118 can request the user to provide additional information that is to be associated with one or more of the program elements 202. Such additional information can be stored in the opaque data field 224. For example, if the program element 202 is related to stock information, the user may be prompted for stock symbols of interest.

The system of the present invention advantageously allows the program information server 104 to dynamically adjust the polling interval of the client computer 100. The polling interval can be adjusted upwards when the program information server 104 becomes overloaded. Conversely, if breaking news occurs, the polling interval can be adjusted downwards such that the client computer 100 receives updates more frequently. Further, as part of the update process and by the use of opaque data, the system of the present invention allows a content provider to customize media items available to a user.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A server comprising:
   an element, executing on a processor, operable to receive a request from a client for one or more new content indicators and/or one or more new content information items;
   said element further operable to determine, in response to said request, new polling time information for the client, said new polling time information to indicate to the client a time to request that one or more content indicators be transmitted by the server to said client; and
   said element further operable to transmit the determined new polling time information from said server to said client, wherein said determined polling time information is to be used by said client for requesting and displaying new content indicators and/or new content information items.

2. The server of claim 1, and further comprising a second element to transmit the requested one or more new content indicators and/or the requested one or more new content information items to said client.

3. The server of claim 1, wherein said element comprises a first element, and further comprising a second element to determine the new polling time information at least in part from the content of the request for the one or more new content indicators and/or the one or more new content information items.

4. The server of claim 1, wherein said element comprises a first element, and further comprising a second element operable to transmit the determined polling time information via a telephone line.

5. The server of claim 1, wherein said element comprises a first element, and further comprising a second element operable to transmit the determined polling time information via a high bandwidth connection.

6. A method of adjusting communication between a remote device and a client device, the method comprising:
   executing the method on a processor of said remote device comprising:
      assessing one or more network conditions;
      determining updated polling time information based at least in part upon the assessed one or more network conditions, the determined polling time information to indicate to said client device one or more times to transmit a request indicating that one or more content indicators be transmitted by said remote device to said client device, said one or more content indicators comprising information at least in part relating to one or more media items;
      sending the determined polling time information from the remote device to the client device, so that said client device can determine a length of time between one or more requests based at least in part upon the determined polling time information;
      intermittently receiving said one or more requests for one or more content indicators and/or one or more media items at the remote device from the client device;
      determining, in response to said one or more requests, newly undated polling time information; and
      transmitting said newly undated polling time information and media items to said client device for display in response to said one or more requests.

7. The method of claim 6, wherein the one or more media items comprise news information.

8. The method of claim 6, wherein the one or more media items comprise sports information.

9. An article comprising: a computer readable media having instructions stored thereon that if executed by a client device enable said client device to:
   receive updated polling time information that indicates to said client device when to intermittently request one or more content indictors and/or one or more content data items be transmitted by a remote device to said client device;
   intermittently request from the remote device, based at least in part upon the received polling time information, that the remote device transmit at least an additional content indicator and/or content data item to said client device;
   receive, in response to said request, newly undated polling time information;
   receive the additional content indicator and/or content data item and/or a uniform resource locator (URL) indicating the address or location of other information related to the content data item; and
   display the received content indicator and/or content data item and information corresponding to the URL related thereto.

10. The article of claim 9, having further instructions stored thereon that if executed by said client device enable said client device to:
    receive a signal indicating a selection of said URL; and
    request additional content data from a second remote device in response to receiving said signal.

11. A client device, comprising:
    an element, executing on a processor, operable to receive updated polling time information from a server, said updated polling time information to indicate to said client device one or more times to transmit a request indicating that one or more content indicators relating at least in part to one or more new content information items be transmitted by said server to said client device;
    said element further operable to intermittently request said server to transmit said one or more content indicators to said client device, wherein said element is further operable to use the received polling time information to determine a time to request said one or more content indicators;
    said element further operable to receive, in response to said request, newly updated polling time information from said server; and
    said element further operable to receive said one or more content indicators and/or one or more new content information items and to display the new content information items at least in part in response to a user request.

12. The client device of claim 11, and further comprising a second element operable to receive said updated polling time information via a telephone line.

13. The client device of claim 11, and further comprising a second element operable to receive the updated polling time information via high bandwidth connection.

14. The client device of claim 11, additionally comprising a processor operable to execute said element.

15. A method of transferring content data items between a client device and a remote device comprising:
executing the method on a processor of said client device comprising:
receiving, at said client device, updated polling time information from the remote device that at least in part indicates to said client device one or more times to intermittently request that at least one content data item be transmitted by the remote device to said client device;
intermittently transmitting a request to the remote device to indicate to the remote device to transmit one or more additional content data items to said client device, the transmission of the request being based at least in part upon the received polling time information, wherein at least one of said intermittent requests results in receiving, at said client device, newly undated polling time information;
receiving the one or more additional content data items and/or a uniform resource locator (URL) related to the address or location of one or more other content data items and/or other information related to the at least one content data item; and
displaying the received content data items, a URL related to the content data items, and/or information relating to the URL.

16. The method of claim 15, and further comprising storing said updated polling time information at said client device.

17. The method of claim 15, and further comprising receiving said updated polling time information via a telecommunication line.

18. The method of claim 15, and further comprising receiving said updated polling time information via a high bandwidth connection.

19. The method of claim 15, and further comprising:
receiving further updated polling time information that at least in part indicates to said client device one or more times to intermittently request that at least an additional content data item be transmitted by the remote device to said client device, said further updated polling time information based at least in part on one or more parameters of said remote device; and
intermittently determining whether said remote device has new content data items available for transmission to said client device, the determining based at least in part upon said one or more times indicated by the further updated polling time information.

20. A method comprising:
executing the method on a processor of a remote device comprising:
receiving, at said remote device, a request to update a client device with program information items;
sending, in response to said request to update said client device with program information items, an updated polling time indicator from said remote device to said client device, said updated polling time indicator indicating to said client device one or more times to request that program information items be transmitted by said remote device to said client device, wherein said program information items comprise information at least in part relating to one or more media items;
intermittently determining at said remote device whether new media items are available, wherein a time for said determining is based at least in part upon said one or more times indicated by said updated polling time indicator; and
transmitting new media items and/or at least in part related program information items for display or rendering on said client device upon the determination that new media items are available on the remote device and/or upon request from said client device.

21. The method of claim 20, additionally comprising modifying a polling interval.

22. The method of claim 21, wherein said modifying the polling interval comprises modifying said updated polling time indicator based at least in part on one or more events.

23. The method of claim 22, wherein said modifying the polling interval further comprises increasing the polling interval at least in part to reduce a load of said remote device.

24. The method of claim 21, additionally comprising customizing the polling interval based at least in part upon one or more actions of said client device.

25. The method of claim 24, wherein the one or more actions of said client device comprise selecting one or more media items.

* * * * *